United States Patent
Zhang

(10) Patent No.: US 10,036,536 B2
(45) Date of Patent: Jul. 31, 2018

(54) LIGHT TRANSMISSION DEVICE FOR AUTOMOBILE LAMP AND AUTOMOBILE LAMP

(71) Applicant: SHANGHAI KOITO AUTOMOTIVE LAMP CO., LTD, Shanghai (CN)

(72) Inventor: Jie Zhang, Shanghai (CN)

(73) Assignee: SHANGHAI KOITO AUTOMOTIVE LAMP CO., LTD, Shanghai (CN)

( * ) Notice: Subject to any disclaimer, the term of this patent is extended or adjusted under 35 U.S.C. 154(b) by 72 days.

(21) Appl. No.: 15/311,044

(22) PCT Filed: Apr. 24, 2015

(86) PCT No.: PCT/CN2015/077375
§ 371 (c)(1),
(2) Date: Nov. 14, 2016

(87) PCT Pub. No.: WO2015/180547
PCT Pub. Date: Dec. 3, 2015

(65) Prior Publication Data
US 2017/0122532 A1    May 4, 2017

(30) Foreign Application Priority Data

May 26, 2014 (CN) .......................... 2014 1 0226360
May 26, 2014 (CN) ..................... 2014 2 0273534 U

(51) Int. Cl.
| F21S 8/10 | (2006.01) |
| F21V 19/00 | (2006.01) |
| F21V 8/00 | (2006.01) |
| F21V 17/10 | (2006.01) |
| F21S 43/00 | (2018.01) |
| F21Y 115/10 | (2016.01) |

(52) U.S. Cl.
CPC .......... *F21V 19/0035* (2013.01); *F21S 43/00* (2018.01); *F21S 48/00* (2013.01); *F21V 17/10* (2013.01); *F21V 19/0055* (2013.01); *G02B 6/0006* (2013.01); *G02B 6/0008* (2013.01); *F21Y 2115/10* (2016.08)

(58) Field of Classification Search
CPC ...... F21S 41/192; F21S 41/196; F21S 43/195; F21S 43/235; F21V 19/0035
See application file for complete search history.

(56) References Cited

U.S. PATENT DOCUMENTS

| 9,702,331 B2 * | 7/2017 | Lim ........................ B60R 25/24 |
| 2008/0188756 A1 * | 8/2008 | Fujimura .................. A61B 8/12 600/459 |
| 2015/0340816 A1 * | 11/2015 | Abe .................... H01R 13/6582 439/607.34 |

* cited by examiner

Primary Examiner — Karabi Guharay
(74) Attorney, Agent, or Firm — CBM Patent Consulting, LLC

(57) ABSTRACT

A kind of light transmission device for automobile lamp and automobile lamp, the light transmission device comprising a light guide, a light source assembly, a fixing bracket and a screw-in type elastic pressing mechanism, wherein the light source assembly is disposed at an end part of the light guide; the fixing bracket is used for fixing the light source assembly and the light guide; the fixing bracket is provided with a mounting hole matching the screw-in type elastic pressing mechanism.

10 Claims, 6 Drawing Sheets

LIGHT TRANSMISSION DEVICE FOR AUTOMOBILE LAMP AND AUTOMOBILE LAMP

This application is the U.S. national phase of International Application No. PCT/CN2015/077375 Filed on 24 Apr. 2015 which designated the U.S. and claims priority to Chinese Application Nos. CN 201410220144.8; CN 201420266051.4 filed on 23 May 2014, the entire contents of each of which are hereby incorporated by reference.

TECHNICAL FIELD

This invention involves automotive technical field, to be specific, it involves a light transmission device for automobile lamp and automobile lamp thereof.

BACKGROUND TECHNOLOGY

The light guide of automobile lamp is generally about 8 mm in diameter, with a plastic solid circular tube of a certain length, and there are light guides in other cross-section shapes, for example, square. An end part of light guide is provided with light source, and the light rays emitted by the light source transmits within the light guide through total reflection after penetrating into the internal part of light guide. For the distance of the light source from the end face of light guide and the position thereof directly affect the amount of light rays emitted by the light source into the internal part of the light guide, it is required to precisely control the distance of the light source from the end face of the light guide so as to ensure a stable light-emitting effect of the light guide.

A traditional mounting method for the light transmission device for automobile lamp is to respectively fix the light guide and assemblies comprising the light source to a fixing bracket, and generally there is a connection between several fixing brackets. Due to the precision of assemblies themselves and the accumulative errors as caused by multiple assembling, it is hard to well control the distance of the end face of light guide from the light source and the position thereof.

At present, a frequently-used mounting method of light guide is as shown in FIG. 1, the light guide is inserted into the fixing bracket and reaches the contact surface, being fixed through the elastic backoff. Namely, when the light guide is inserted, the elastic backoff deforms and expands, and when the light guide is inserted and reaches the contact face, the elastic backoff resumes to natural state, forming fixation for the light guide.

Defects of this mounting method are:

(1) Due to the elasticity of the light guide, it is hard to press it in place when assembling.

(2) Generally two or three elastic backoffs are installed to realize the stability of fixation, which makes it hard to judge whether all snap joints have been installed in place, namely, it is hard to judge whether other snap joints have locked the light guide after a certain snap makes it.

(3) For the convenience of assembling, generally, a little gap is left between the snap joint and the lug boss of light guide, which causes improper positioning of the light guide, to be precise, there is a little movement after the light guide is mounted in place, which causes a range of deviation of the distance of light guide from LED light source.

SUMMARY OF THE INVENTION

The purpose of this invention is to provide a light transmission device for automobile lamp and automobile lamp thereof, and this invention sets up a screw-in type elastic pressing mechanism which can precisely control the distance of the light source from the end face of light guide to solve the problem of poor light-emitting effect of automobile lamp caused by the deviation of distance of the end face of light guide from the light source as incurred by improper positioning of light guide in existing mounting method.

To achieve the above purpose, the scheme of this invention is that:

a light transmission device for automobile lamp, comprising a light guide, a light source assembly and a fixing bracket, also comprising a screw-in type elastic pressing mechanism which is provided with a first mounting hole matching the mounting of light guide;

aforesaid light guide is provided with a first lug boss;

the inner wall of aforesaid first amounting hole is provided with guide slot matching the first lug boss, making it able to insert the light guide into the first mounting hole via cooperation of the lug boss with the guide slot, Corresponding position of aforesaid first mounting hole is also provided with the fixed neck matching aforesaid first lug boss which enables the light guide to be stuck in the fixed neck via the first lug boss through rotary screw-in type elastic pressing mechanism to realize the fixing of the light guide to the screw-in type elastic pressing mechanism.

Aforesaid fixing bracket is provided with a second mounting hole matching aforesaid screw-in type elastic pressing mechanism; one end of the screw-in type elastic pressing mechanism is provided with a second lug boss; the inner wall of aforesaid second mounting hole is provided with vias matching the second lug boss, and aforesaid screw-in type elastic pressing mechanism passes through aforesaid second mounting hole through the cooperation of the second lug boss with vias, making the second lug boss stuck on the edge of the end face of second mounting hole through screw-in type elastic pressing mechanism and limiting the escape of screw-in type elastic pressing mechanism from the second mounting hole.

The contact surface of aforesaid fixing bracket with the second lug boss is provided with spacing lug boss which is used to block the second lug boss when rotating and limit the rotation deviation of the screw-in type elastic pressing mechanism;

The other end of aforesaid screw-in type elastic pressing mechanism is symmetrically provided with two circular-arc elastic pieces; aforesaid two elastic pieces are provided with spacing embossment; one end face of aforesaid second mounting hole contacting the elastic piece is provided with a groove matching aforesaid spacing embossment which is in the groove after the screw-in type elastic pressing mechanism passes through the second mounting hole and slips off from the groove through the screw-in type elastic pressing mechanism, enabling the screw-in type elastic pressing mechanism to drive the light guide to deviate from the set distance to the direction of light source assembly.

Aforesaid light source assembly is fixedly mounted to the fixing bracket and tightly pressed to the contact surface of the screw-in type elastic pressing mechanism under the elastic force from the elastic piece.

According to the light transmission device as stated in this invention, further, the outer side of the end face of the end fitted with elastic piece of aforesaid screw-in type elastic pressing mechanism is provided with a raised clamping platform, which is used for the positioning of the screw-in type elastic pressing mechanism after rotating.

According to the light transmission device as stated in this invention, further, aforesaid screw-in type elastic pressing mechanism is provided with knock holes used for its fixing to light source assembly, aforesaid light source assembly is provided with locating pin used for cooperation with aforesaid knock hole.

According the light transmission device as stated in this invention, further, aforesaid fixing bracket is fixedly mounted to the light source assembly through screws.

According the light transmission device as stated in this invention, further, at least two aforesaid first lug bosses and second lug bosses are mounted.

This invention also provides an automobile lamp, comprising a light transmission device. Aforesaid light transmission device comprises a light guide, a light source assembly and a fixing bracket whose features are: also comprising a screw-in type elastic pressing mechanism which is provided with the first mounting hole matching mounting of light guide; aforesaid light guide is provided with the first lug boss; the inner wall of aforesaid first amounting hole is provided with a guide slot matching the first lug boss, making it able to insert the light guide into the first mounting hole via cooperation of the first lug boss with the guide slot. Corresponding position of aforesaid first mounting hole is also provided with fixed neck matching aforesaid first lug boss which enables the light guide to be stuck in neck via the first lug boss through rotary screw-in type elastic pressing mechanism to realize the fixing of light guide to the screw-in type elastic pressing mechanism;

Aforesaid fixing bracket is provided with the second mounting hole matching aforesaid screw-in type elastic pressing mechanism, and one end of screw-in type elastic pressing mechanism is provided with the second lug boss; internal wall of aforesaid second mounting hole is provided with vias matching the second lug boss; aforesaid screw-in type elastic pressing mechanism passes through aforesaid second mounting hole through the cooperation of the second lug boss with vias, making the second lug boss stuck on the edge of the end face of second mounting hole through the screw-in type elastic pressing mechanism and limiting the escape of screw-in type elastic pressing mechanism from the second mounting hole. The contact surface of aforesaid fixing bracket with the second lug boss is provided with spacing lug boss which is used to block the second lug boss when rotating and limit the rotation deviation of screw-in type elastic pressing mechanism;

The other end of aforesaid screw-in type elastic pressing mechanism is symmetrically provided with two circular-arc elastic pieces; aforesaid two elastic pieces are provided with spacing embossment, and one end face of aforesaid second mounting hole contacting the elastic piece is provided with a groove matching aforesaid spacing embossment which is in the groove after screw-in type elastic pressing mechanism passes through the second mounting hole, and slips off from the groove through the screw-in type elastic pressing mechanism, enabling the screw-in type elastic pressing mechanism to drive the light guide to deviate from the set distance to the direction of light source assembly;

Aforesaid light source assembly is fixedly mounted to the fixing bracket and is tightly pressed against the contact surface of the screw-in type elastic pressing mechanism under the elastic force from the elastic piece.

According to the automobile lamp as stated in this invention, further, the outer side of the end face of the end fitted with elastic piece of aforesaid screw-in type elastic pressing mechanism is provided with a raised clamping platform, which is used for the positioning of the screw-in type elastic pressing mechanism after rotating.

According to the automobile lamp as stated in this invention, further, aforesaid screw-in type elastic pressing mechanism is provided with knock holes used for its fixing to the light source assembly, and aforesaid light source assembly is provided with locating pins used for cooperation with aforesaid knock holes.

According to the automobile lamp as stated in this invention, further, aforesaid fixing bracket is fixedly mounted to the light source assembly through screws.

According to the automobile lamp as stated in this invention, further, at least two aforesaid first lug bosses and second lug bosses are mounted.

The purpose of this invention is also to provide a mounting method for a kind of light transmission device, including the following steps:

(1) Pass one end of the light guide fitted with the first lug boss through the second mounting hole and move the screw-in type elastic pressing mechanism 1 to the second mounting hole along the opposite direction, meantime, the light guide is inserted into the screw-in type elastic pressing mechanism through the cooperation of the first lug boss with the guide slot and the screw-in type elastic pressing mechanism drives the light guide to pass through the second mounting hole through the cooperation of the first lug boss with vias;

(2) The screw-in type elastic pressing mechanism makes the first lug boss lock the fixing neck, making the screw-in type elastic pressing mechanism fixed to the light guide; meanwhile, the screw-in type elastic pressing mechanism drives the light guide to together deviate from the set distance to the direction of light source assembly; the spacing lug boss of the elastic piece contacts with the contacting surface and generates a certain amount of deformation, and three second lug bosses lock the second mounting hole of the fixing bracket, preventing the screw-in type elastic pressing mechanism escaping from the fixing bracket so as to realize the fixing of the fixing bracket to the screw-in type elastic pressing mechanism;

(3) Insert the two locating pins of light source assembly into two knock holes of the screw-in type elastic pressing mechanism and fix them to the fixing bracket through four screws. When the light source assembly is fixed to the fixing bracket, the mounting surface of light source assembly contacts with the mounting surface of the screw-in type elastic pressing mechanism and drives the screw-in type elastic pressing mechanism, together with the light guide, to move to the direction away from the light source assembly, and the elastic piece deforms and generates elastic force, making the screw-in type elastic pressing mechanism, together with the light guide, tightly pressed to the light source assembly.

The beneficial effects achieved by this invention: The screw-in type elastic pressing mechanism is set between the light guide and light source assembly, ensuring the contact of the screw-in type elastic pressing mechanism with the mounting surface of light source assembly by taking advantage of the elastic force of two elastic pieces, making the screw-in type elastic pressing mechanism drive the light guide tightly pressed to the mounting surface of light source assembly, which solves the problem of a certain range of deviation from the distance of the light guide from LED light source as caused by a little movement after the light guide is installed in place in present frequently-used mounting method. The mounting method of this invention helps to ensure the distance of the light guide from the light source and the position thereof, making the light-emitting effect of automobile lamp more stable.

SPECIFIC EMBODIMENT

Next, this invention will be further explained in detail by combining with the figures.

Figure 1:
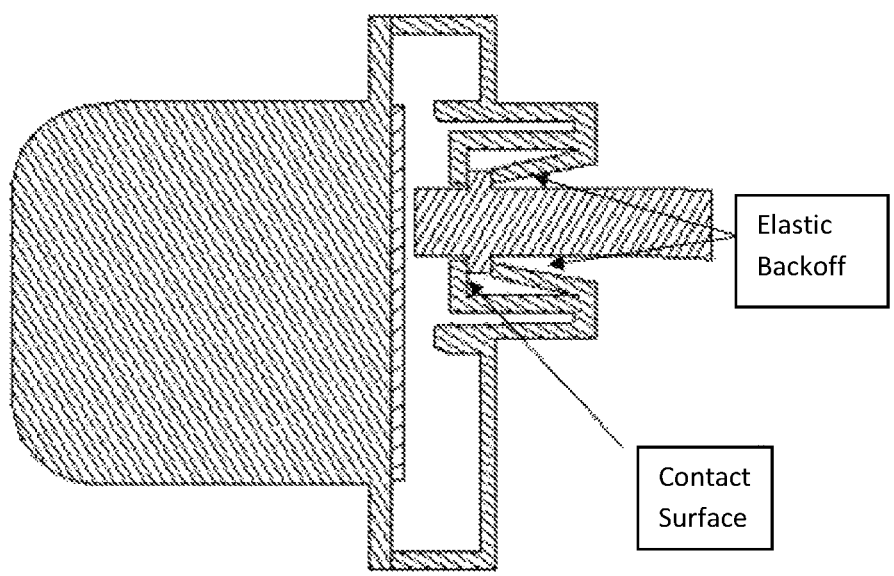
FIG. 1 is the schematic diagram for the installation of existing light guide.
Figure 2:
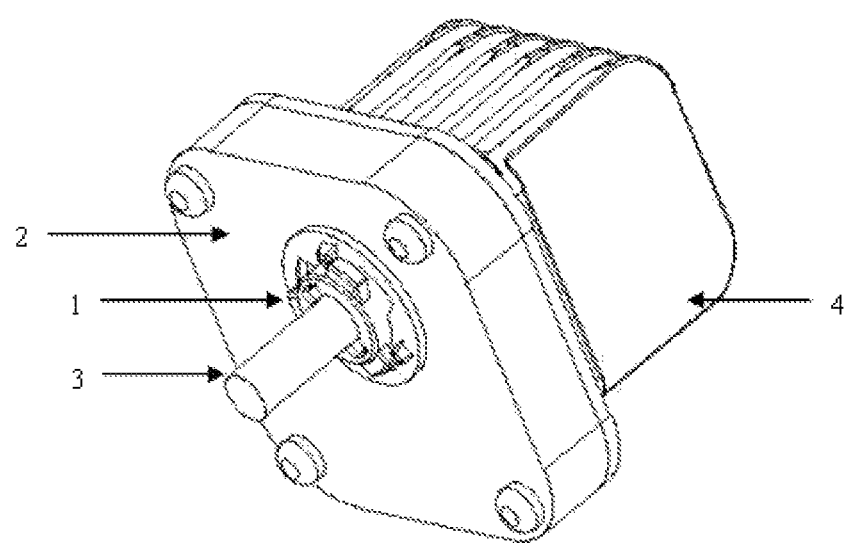
FIG. 2 is the structural schematic diagram for the light transmission device in this invention.

Implementation Example of the Light Transmission Device of Automobile Lamp for this Invention:

As shown in FIG. 2, the light transmission device of this implementation example comprises screw-in type elastic pressing mechanism 1, fixing bracket 2, light guide 3 and light source assembly 4. The screw-in type elastic pressing mechanism 1 is provided with the first mounting hole for the cooperation of installation with light guide 3 and the light guide is inserted into the screw-in type elastic pressing mechanism 1 via the first mounting hole. The fixing bracket 2 is provided with the second mounting hole for the cooperation with screw-in type elastic pressing mechanism 1, one end of which passes through aforesaid second mounting hole and is fixed for cooperation with the fixing neck set in the first mounting hole through the first lug boss set in the light guide after rotating and the other end of which is fixed with light source assembly 4 via locating pins, and aforesaid light source assembly 4 is fixed to fixing bracket 2 by screws.

Figure 3:
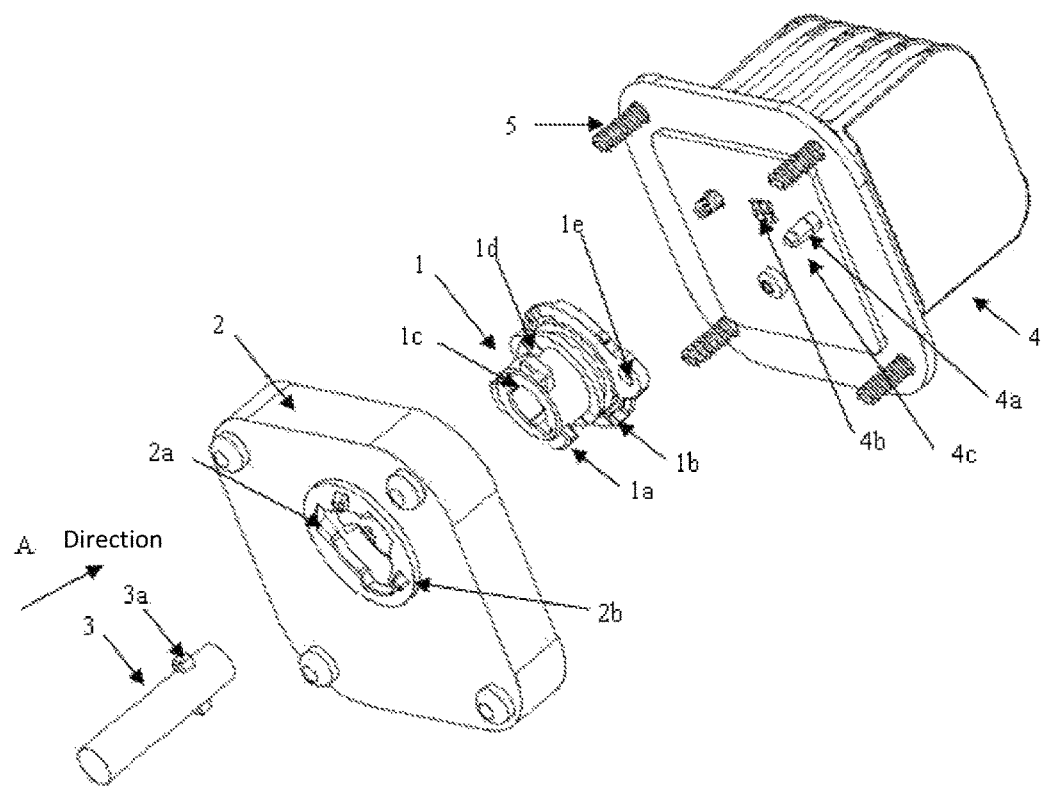
FIG. 3 is the breakdown view 1 for the light transmission device in this invention.

As shown in FIG. 3, screw-in type elastic pressing mechanism 1 of this implementation example comprises three second lug bosses 1a, two elastic pieces 1b, guide slot 1c, fixing neck 1d and two knock hole 1e. Light guide 3 comprises the first lug boss 3a used for fixing light guide 3, and the first lug boss 3a cooperates with fixing neck 1d, achieving the fixing of light guide with screw-in type elastic pressing mechanism 1. Size of guide slot 1c is slightly larger than outline size of three second lug boss 1a and light guide 3a is inserted into screw-in type elastic pressing mechanism 1 through the cooperation of the first lug boss 3a with guide slot 1c. The inner side of the first mounting hole of fixing bracket 2 comprises vias 2a whose size is slightly larger than the outline size of three second lug boss 1a and screw-in type elastic pressing mechanism 1 passes through aforesaid second mounting holes through the cooperation of three second lug boss 1a with vias 2a. After the light guide is inserted into screw-in type elastic pressing mechanism 1 and screw-in type elastic pressing mechanism 1 passes through aforesaid second mounting hole, screw-in type elastic pressing mechanism 1 is operated, making the first lug boss 3a stuck in the fixing neck 1d to realize the fixing of the light guide to screw-in type elastic pressing mechanism 1, meantime, making the second lug boss 1a stuck on the edge of the first mounting hole and screw-in type elastic pressing mechanism 1 stuck on fixing bracket 2 via the second lug boss 1a so as to prevent screw-in type elastic pressing mechanism 1 escaping from mounting holes of the fixing bracket.

Figure 4:
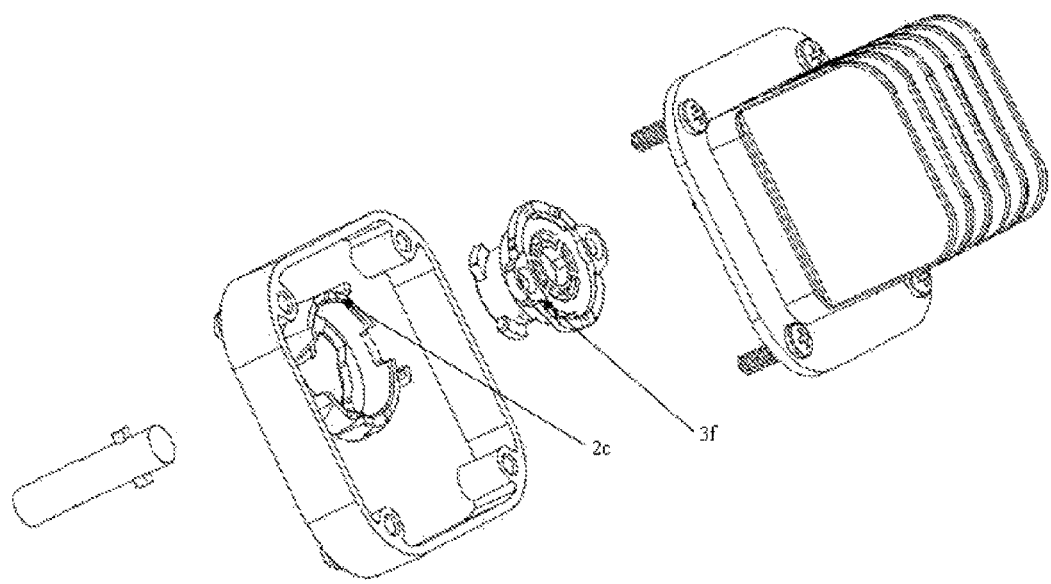
FIG. 4 is the breakdown view 2 for the light transmission device in this invention.
Figure 5:
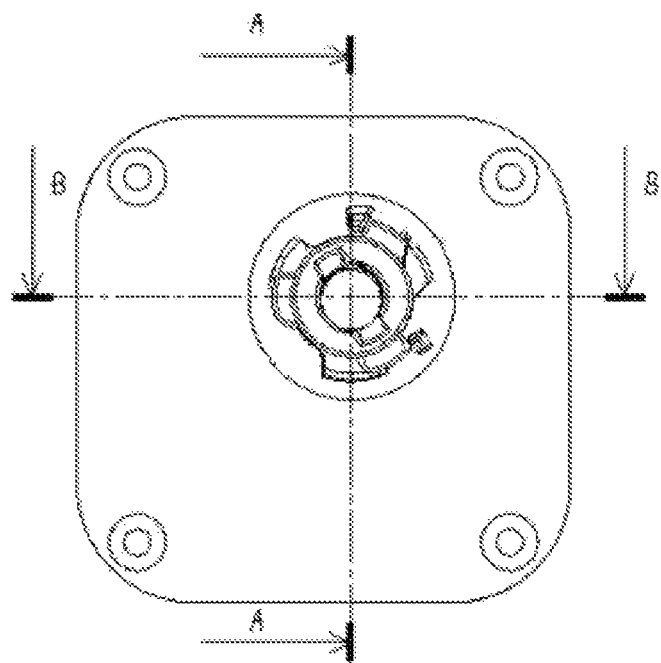
FIG. 5 is the front view for the light transmission device in this invention.
Figure 6:
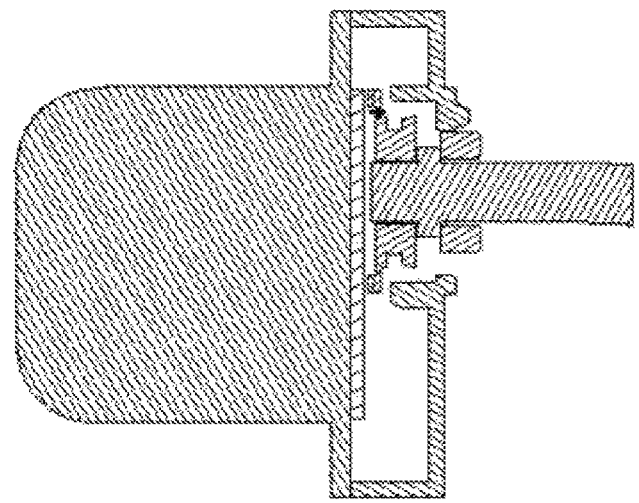
FIG. 6 is the A-A cross-section diagram for the light transmission device in this invention.
Figure 7:
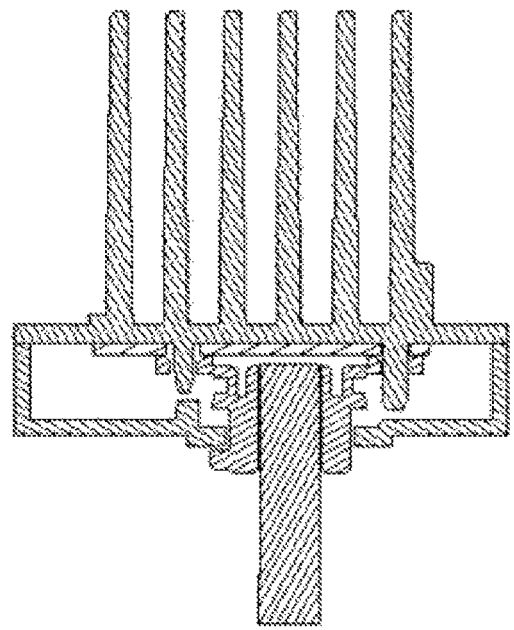
FIG. 7 is the B-B cross-section diagram for the light transmission device in this invention.

The contacting surface of aforesaid fixing bracket with the first lug boss 3a comprises spacing lug boss which is used to block the first lug boss 3a when rotating and limit the rotation deviation of screw-in type elastic pressing mechanism 1. As shown in FIG. 4, two circular-arc elastic pieces mounted to screw-in type elastic pressing mechanism 1 are provided with spacing embossment; one end face of the second mounting hole matching elastic piece 1b is provided with a groove matching aforesaid spacing embossment. After screw-in type elastic pressing mechanism 1 passes through the second mounting hole, aforesaid spacing embossment is in the groove and aforesaid spacing embossment slips off from the groove through screw-in type elastic pressing mechanism, enabling screw-in type elastic pressing mechanism 1 to drive the light guide to deviate from the set distance to the direction of light source assembly and the spacing embossment of elastic piece 1d to contact with the contacting surface 2c of the second mounting hole. The outer side of an end fitted with elastic pieces of screw-in type elastic pressing mechanism 1 in this implementation example is provided with a raised clamping platform, used for the positioning of the screw-in type elastic pressing mechanism after rotating, which finally realizes the fixing of screw-in type elastic pressing mechanism 1 to fixing bracket 2.

Light source assembly 4 is provided with light source 4b, two locating pin 4a and four screw 4. Locating pin 4a cooperates with two knock hole 1e on screw-in type elastic pressing mechanism 1, which fixes light source assembly to the screw-in type elastic pressing mechanism, preventing the deviation of screw-in type elastic pressing mechanism 1 after its positioning.

Light source assembly 4 is fixedly mounted to fixing bracket 2 via four screw 5. When light source assembly 4 is fixed to fixing bracket 2, the mounting surface 4c of light source assembly 4 contacts with the mounting surface 3f of screw-in type elastic pressing mechanism 1 and drives the screw-in type elastic pressing mechanism, together with the light guide, to move to A direction away from the light source, making two elastic pieces deform and generate elastic force, which further makes the screw-in type elastic pressing mechanism drive the light guide tightly pressed to the light source assembly.

Assembling process for the light transmission device in this invention is:

Pass one end of light guide 3 fitted with the first lug boss through the second mounting hole along A direction and move the screw-in type elastic pressing mechanism to the second mounting hole along the opposite direction, meantime, light guide 3 is inserted into the screw-in type elastic pressing mechanism through the cooperation of the first lug boss 3a with guide slot 1c and the screw-in type elastic pressing mechanism drives light guide 3 to pass through the second mounting hole along the direction opposite to A direction through the cooperation of the first lug boss with vias 2a.

Then rotate the screw-in type elastic pressing mechanism, making two first lug boss 3a lock the fixing neck 1d and screw-in type elastic pressing mechanism 1 fixed to light guide 3. Meantime, screw-in type elastic pressing mechanism 1 drives the light guide to deviate from the set distance to the direction of light source assembly, the spacing lug boss of the elastic piece 1d contacts with the contacting surface 2c and generates a certain amount of deformation, and three second lug boss 1a lock the second mounting hole of the fixing bracket 2, preventing the screw-in type elastic pressing mechanism 1 escaping from the fixing bracket 2 so as to realize the fixing of the fixing bracket 2 to the screw-in type elastic pressing mechanism 1;

Finally, insert two locating pin 4a of light source assembly into two knock hole 1e of screw-in type elastic pressing mechanism 1 and fix them to fixing bracket 2 through four screw 5. Because the elastic force of elastic pieces makes screw-in type elastic pressing mechanism 1 and light guide 3 deviate for a certain distance along A direction when screw-in type elastic pressing mechanism 1 is rotating; when light source assembly 4 is fixed to fixing bracket 2, the mounting surface 4c of light source assembly contacts with the mounting surface 3f of screw-in type elastic pressing mechanism 1 and drives screw-in type elastic pressing mechanism 1, together with light guide 3, to move along the opposite direction of A direction, making two elastic pieces deform and generate elastic force, which makes screw-in type elastic pressing mechanism 1, together with light guide 3, tightly pressed to light source assembly 4.

Due to elastic force of elastic pieces, when the light source assembly is mounted, the light source assembly only drives the elastic pieces to deform, and the screw-in type elastic pressing mechanism and light guide does not deviate from the light source, and because the screw-in type elastic pressing mechanism and the light guide have been made to deviate from the set distance to the direction of light source assembly when screw-in type elastic pressing mechanism 1 is rotated, the distance of the end face of light guide from the light source and the position thereof will not be affected even though screw-in type elastic pressing mechanism 1 is made to drive light guide 3 to slightly deviate to the direction away from the light source, making the distance of end face of light guide from the light source and the position thereof ensued.

Implementation Example of Automobile Lamp in this Invention:

The automobile lamp of this implementation example comprises the light transmission device whose implementation example is the same as the above implementation example of the light transmission device for automobile lamp, so it will not be repeated here.

The screw-in type elastic pressing mechanism is set between the light guide and the light source assembly, ensuring the contact of the screw-in type elastic pressing mechanism with the mounting surface of light source assembly by taking advantage of the elastic force of two elastic pieces, making the screw-in type elastic pressing mechanism drive the light guide tightly pressed to the mounting surface of light source assembly, which solves the problem of a certain range of deviation from the distance of the light guide from LED light source as caused by a little movement after the light guide is installed in place in present frequently-used mounting method. The mounting method of this invention helps to ensure the distance of the light guide from the light source and the position thereof, making the light-emitting effect of automobile lamp more stable.

What is claimed is:

1. A light transmission device for automobile lamp, comprising a light guide, a light source assembly and a fixing bracket, characterized in that: the light transmission device also comprises a screw-in type elastic pressing mechanism which is provided with a first mounting hole matching the mounting of light guide; aforesaid light guide is provided with a first lug boss; the inner wall of aforesaid first mounting hole is provided with guide slot matching the first lug boss, making it able to insert the light guide into the first mounting hole via cooperation of the first lug boss with the guide slot; corresponding position of aforesaid first mounting hole is also provided with fixed neck matching aforesaid first lug boss which enables the light guide to be stuck in neck via the first lug boss through rotary screw-in type elastic pressing mechanism so as to realize the fixing of light guide to the screw-in type elastic pressing mechanism;

aforesaid fixing bracket is provided with a second mounting hole matching aforesaid screw-in type elastic pressing mechanism, and one end of the screw-in type elastic pressing mechanism is provided with a second lug boss; internal wall of aforesaid second mounting hole is provided with vias matching the second lug boss; aforesaid screw-in type elastic pressing mechanism passes through aforesaid second mounting hole through the cooperation of the second lug boss with vias, making the second lug boss stuck on the edge of the end face of second mounting hole through the screw-in type elastic pressing mechanism and limiting the escape of screw-in type elastic pressing mechanism from the second mounting hole; the contact surface of aforesaid fixing bracket with the second lug boss is provided with a spacing lug boss which is used to block the second lug boss when rotating and limit the rotation deviation of screw-in type elastic pressing mechanism;

the other end of aforesaid screw-in type elastic pressing mechanism is symmetrically provided with two circular-arc elastic pieces; aforesaid two elastic pieces are provided with spacing embossment, and one end face of aforesaid second mounting hole contacting the elastic piece is provided with groove matching aforesaid spacing embossment which is in the groove after screw-in type elastic pressing mechanism passes through the second mounting hole, and slips off from the groove through screw-in type elastic pressing mechanism, enabling the screw-in type elastic pressing mechanism to drive the light guide to deviate from the set distance to the direction of light source assembly;

aforesaid light source assembly is fixedly mounted to the fixing bracket and tightly pressed against the contact surface of the screw-in type elastic pressing mechanism under the elastic force from the elastic piece.

2. The light transmission device as claimed in claim 1, characterized in that the outer side of the end face of the end fitted with elastic piece of aforesaid screw-in type elastic pressing mechanism is provided with a raised clamping platform, which is used for the positioning of the screw-in type elastic pressing mechanism after rotating.

3. The light transmission device as claimed in claim 1, characterized in that aforesaid screw-in type elastic pressing mechanism is provided with knock holes used for its fixing to the light source assembly, and aforesaid light source assembly is provided with locating pins used for cooperation with aforesaid knock holes.

4. The tight transmission device as claimed in claim 1, characterized in that aforesaid fixing bracket is fixedly mounted to the light source assembly through screws.

5. The light transmission device as claimed in claim 1, characterized in that at least two aforesaid first lug bosses and second lug bosses are mounted.

6. An automobile lamp, comprising a light transmission device, which comprises a light guide, a light source assembly and a fixing bracket, characterized in that: the light transmission device also comprises a screw-in type elastic pressing mechanism which is provided with a first mounting hole matching mounting of light guide; aforesaid light guide is provided with a first lug boss; the inner wall of aforesaid first amounting hole is provided with guide slot matching the first lug boss, making it able to insert the light guide into the first mounting hole via cooperation of the first lug boss with the guide slot; corresponding position of aforesaid first mounting hole is also provided with fixed neck matching aforesaid first lug boss which enables the light guide to be stuck in neck via the first lug boss through rotary screw-in type elastic pressing mechanism so as to realize the fixing of light guide with screw-in type elastic pressing mechanism;

aforesaid fixing bracket is provided with a second mounting hole matching aforesaid screw-in type elastic pressing mechanism; the outer wall of screw-in type elastic pressing mechanism is provided with a second lug boss; the internal wall of aforesaid second mounting hole is provided with vias matching the second lug boss; aforesaid screw-in type elastic pressing mechanism passes through aforesaid second mounting hole through the cooperation of the second lug boss with vias, making the second lug boss stuck on the edge of the end face of the second mounting hole through the screw-in type elastic pressing mechanism and limiting the escape of screw-in type elastic pressing mechanism from the second mounting hole; the contact surface of aforesaid fixing bracket with the second lug boss is provided with spacing lug boss which is used to block the second lug boss when rotating and limit the rotation deviation of screw-in type elastic pressing mechanism;

the other end of aforesaid screw-in type elastic pressing mechanism is symmetrically provided with two circular-arc elastic pieces; aforesaid two elastic pieces are provided with spacing embossment, and one end face of aforesaid second mounting hole contacting the elastic piece is provided with a groove matching aforesaid spacing embossment which is in the groove after screw-in type elastic pressing mechanism passes through the second mounting hole, and slips off from the groove through the screw-in type elastic pressing mechanism, enabling the screw-in type elastic pressing mechanism to drive the light guide to deviate from the set distance to the direction of light source assembly;

aforesaid light source assembly is fixedly mounted to the fixing bracket and under the elastic force from the elastic piece, the screw-in type elastic pressing mechanism is tightly pressed against the contact surface of the light source assembly.

7. The automobile lamp as claimed in claim 6, characterized in that outer side of the end face of the end fitted with elastic piece of aforesaid screw-in type elastic pressing mechanism is provided with a raised clamping platform, which is used for the positioning of the screw-in type elastic pressing mechanism after rotating.

8. The automobile lamp as claimed in claim 6, characterized in that aforesaid screw-in type elastic pressing mechanism is provided with knock holes used for its fixing to light source assembly, and aforesaid light source assembly is provided with locating pins used for cooperation with aforesaid knock holes.

9. The automobile lamp as claimed in claim 6, characterized in that aforesaid fixing bracket is fixedly mounted to the light source assembly through screws.

10. The automobile as claimed in claim 6, characterized in that at least two aforesaid first lug bosses and second lug bosses are mounted.

* * * * *